UNITED STATES PATENT OFFICE.

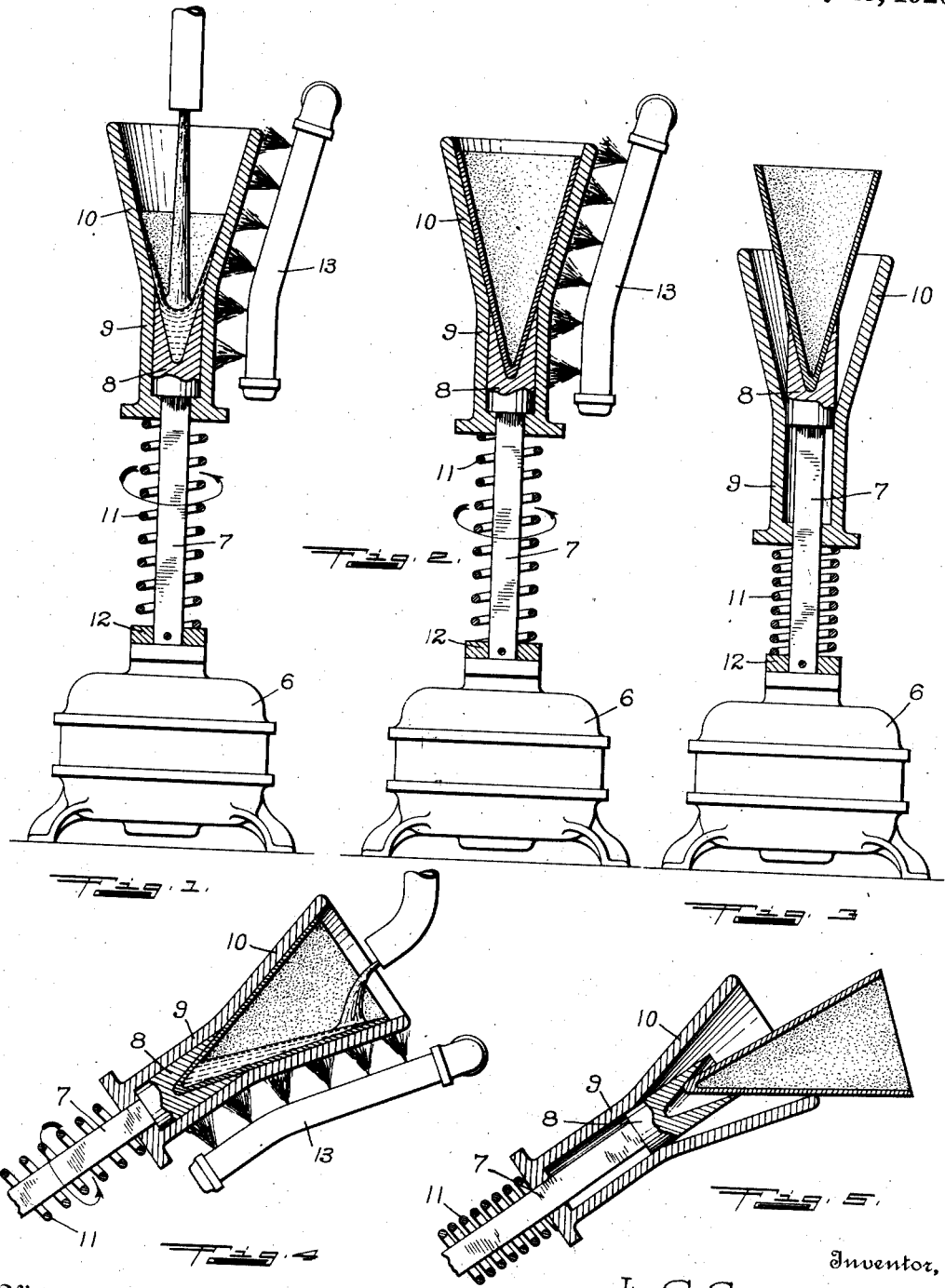

LEE C. SHARP, OF PLATTSMOUTH, NEBRASKA.

METHOD AND MEANS FOR FORMING AND BAKING CUP-PASTRY.

1,341,081.  Specification of Letters Patent. Patented May 25, 1920.

Application filed July 31, 1919. Serial No. 314,400.

*To all whom it may concern:*

Be it known that I, LEE C. SHARP, a citizen of the United States, and a resident of Plattsmouth, in the county of Cass and State of Nebraska, have invented certain new and useful Improvements in Methods and Means for Forming and Baking Cup-Pastry, of which the following is a specification.
My invention relates to the manufacture of cup pastry, such as the familiar ice-cream cones and like articles, which are formed by the baking of a fluid batter within a suitable mold, whereby the baked article takes the form of the mold as the baking is completed and the fluid material is solidified by the chemical changes and loss of moisture therefrom during the baking. It is the object of my invention to provide a method and means whereby such pastry may be formed without waste of the material used therein. A further object of my invention is to provide a method and means for effecting the distribution of batter within a hollow mold or mold-cavity without the use of an interior forming member or core. The special characteristic of my method of making articles of the class described, lies in the rotation of a mold to effect the distribution of the fluid material therein prior to and during the baking thereof. Similarly, the particular characteristic of the mechanism or apparatus employed in carrying out my invention lies in the provision of a mold which is rotatable upon the axis of symmetry thereof, whereby to effect the uniform distribution of batter upon the interior surface thereof, either by centrifugal or gravital action, or both. The simplicity and desirability of my method and apparatus; the ease and directness with which the material may be introduced into the mold, and the baked article removed therefrom; and the elimination of the complication and wastefulness incident to the use of molds having cores or interior forming devices, will be apparent from the following description, reference being had to the accompanying drawings, forming part hereof.
In the drawing Figure 1 is a vertical sectional view of a mold as provided by my invention, showing the filling thereof and the distribution of the fluid material by centrifugal action, Fig. 2 is a similar view showing the condition at the completion of the baking, Fig. 3 is a similar view showing the removal of the baked article from the mold, Fig. 4 is a view showing the rotary mold in inclined position for gravital distribution of the fluid material, and Fig. 5 is a similar view showing the ejection of the baked article from the inclined mold.

Referring first to the illustrated mechanism or device for carrying out my invention, there is shown in Figs. 1, 2 and 3 an electric motor 6 having a direct-connected vertical shaft 7 which may be driven thereby at a suitable speed. At the upper end of the shaft there is an enlarged cylindrical head 8 having a conical recess in its upper end, said recess being coaxial with the head and the axis of rotation of the shaft. Fitting slidably about the head 8 is a sleeve 9 of which a portion extends in beneath the head to engage the shaft, and said portion of the shaft is squared so that its rotary movement may be communicated to the sleeve, while the latter is slidable vertically thereon. The upper portion of the sleeve 9 is flared to form a conical cup 10 of which the inner surface is continuous with the recess of cavity in the end of the head 8, when the parts are in their normal position. The vertically slidable member, formed by the sleeve 9 and cup 10, is held normally in the raised position shown in Figs. 1 and 2 by means of a spring 11 which is disposed around the shaft 7, the lower end of said spring resting upon a collar 12 affixed to the shaft near the lower end thereof. By compression of the spring the slidable member may be pushed downwardly, relative to the head and shaft, to a position such as shown in Fig. 3. The parts 8, 9 and 10 form a mold for receiving the fluid material to be baked, and said mold may be heated by any suitable means such as the gas burner 13, shown as disposed at one side thereof in Figs. 1 and 2. As the mold is rotated during the use thereof, the walls thereof will be uniformly heated by a heating device at one side thereof.

In the use of the described mechanism, the mold is preferably first heated to baking temperature, and thereafter a suitable quantity of batter introduced therein by any desired means. Either initially or at the time of introduction of the batter, the rate of rotation is so regulated that the batter will be thrown outward centrifugally with sufficient force to cause the same to ascend the inclined surface of the mold-cavity. Upon coming into contact with the heated mold-walls the batter is solidified and adheres thereto to form a shell of substantially uniform thickness, thus facilitating the even distribution of the material over the surface of the cavity. The cavity or recess of the mold being entirely open during the baking, steam or gaseous products evolved by the heating of the material may escape freely, and there need be no loss or waste of material due to overflowing of the mold, such as usually occurs when baking products of this character in closed molds provided with cores for forming the interior of the cups or cones.

After completion of the baking, as represented in Fig. 2, the removal of the baked product is facilitated by pushing the member 9—10 downwardly against the spring 11, as shown in Fig. 3, thus detaching the same from the baked article, which will be supported by the head 8 and extend above the upper margin of the cup 10, so as to be readily detached. The removal of the baked article may be effected, if desired, without stopping the rotation of the mold.

By disposing the mold in an inclined position as represented in Figs. 4 and 5, the distribution of the batter may be effected gravitally by rotating the mold at a slow or moderate rate, or, by increasing the rate of rotation of the inclined mold, the distribution may be both gravital and centrifugal in character.

Now, having described my invention, what I claim and desire to secure by Letters Patent is:

1. The method of producing pastry cups in a mold shaped to form the exterior of the cup, consisting in partially filling the mold with fluid batter, rotating the mold to spread the batter over the surface of the mold, and baking the layer of batter while the mold is rotating.

2. The method of producing pastry cups in a mold shaped to form the exterior of the cup, consisting in introducing batter into the mold, rotating the latter to distribute the batter therein, and baking the distributed material.

3. The method of producing pastry cups in a mold shaped to form the exterior of the cup, consisting in introducing a quantity of batter into the mold, rotating the mold to cause the batter to flow uniformly over the interior surface thereof, and heating the mold to bake the batter upon said surface.

4. The method of producing pastry cups in a mold shaped to form the exterior of the cup, consisting in heating the mold, introducing a quantity of batter therein, and rotating the mold to distribute the batter over its surface simultaneously with the baking thereof by the applied heat.

5. The method of distributing pastry batter in a baking mold, consisting in rotating the mold, and heating the same during the rotation thereof.

6. Means for making pastry cups, comprising a mold having an open-ended cavity therein, means for rotating the mold about the axis of said cavity, and means for heating the mold.

7. Pastry baking means, comprising a mold having an open cavity therein formed symmetrically to a fixed axis, means for rotating said mold about said axis, means for heating the mold, and means relatively movable longitudinally of said axis for ejecting baked product from the cavity.

LEE C. SHARP.